United States Patent

[11] 3,627,734

| [72] | Inventors | Shigehiro Ohuchi;<br>Chikara Sano, both of Mishima-shi,<br>Shizuoka-ken; Eiichi Hayashi, Ehime-ken,<br>all of Japan |
|---|---|---|
| [21] | Appl. No. | 864,904 |
| [22] | Filed | Oct. 8, 1969 |
| [45] | Patented | Dec. 14, 1971 |
| [73] | Assignee | Toray Industries, Inc.<br>Tokyo, Japan |
| [32] | Priorities | Oct. 15, 1968 |
| [33] | | Japan |
| [31] | | 43/74677;<br>Oct. 15, 1968, Japan, No. 43/74678 |

[54] POLYESTER FIBER IMPROVED IN DYEABILITY, AND PROCESS FOR THE PREPARATION THEREOF
5 Claims, No Drawings

[52] U.S. Cl. .................................................. 260/75 N,
8/DIG. 4, 264/290
[51] Int. Cl. .................................................. C08g 17/14,
C08g 39/04

[50] Field of Search ............................................. 260/75 N

[56] References Cited
UNITED STATES PATENTS

| 2,945,010 | 7/1960 | Caldwell et al. ............... | 260/75 |
| 3,161,608 | 12/1964 | Caldwell et al. ............... | 260/13 |
| 3,305,603 | 2/1967 | McIntyre et al. .............. | 260/860 |
| 3,386,795 | 6/1968 | Caldwell et al. ............... | 8/100 |
| 3,432,472 | 3/1969 | Caldwell......................... | 260/75 |

FOREIGN PATENTS

| 4,017,140 | 8/1965 | Japan .......................... | |

Primary Examiner—Melvin Goldstein
Attorney—Paul & Paul

ABSTRACT: Polyester fibers containing acid dyes are rendered light fast by incorporating into the polyester melamine, or isomelamine, or various alkyl, aralkyl, cycloalkyl amino, substituted amino and other addition products thereof. The present invention relates to a polyester fiber which is dyeable with an acid dyestuff, and to a process for the preparation thereof.

POLYESTER FIBER IMPROVED IN DYEABILITY, AND PROCESS FOR THE PREPARATION THEREOF

GENERAL FIELD OF THE INVENTION

It is known that a so-called polyester fiber such as polyethylene terephthalate or a copolymer thereof, poly-1, 4 cyclohexanedimethylene terephthalate or a copolymer thereof, a polyester obtained from paraoxyethoxybenzoic acid or a copolymer thereof, has high crystallinity, a high softening point, has excellent characteristics of strength and elongation, flexural strength, chemical resistance, resistance to light and heat resistance and has great value industrially. However, its uses are somewhat limited because of deficiencies such as poor dyeability, susceptibility to charging with static electricity and tendency to pills. Foremost among these deficiencies, the poor dyeability of a polyester fiber is a grave shortcoming and remains as an unsolved problem.

DISCUSSION OF THE PRIOR ART

Heretofore, fibers or fabrics prepared from polyester such as polyethylene terephthalate have had poor affinity for ionic dyestuffs such as acid dyestuffs and basic dyestuffs. Such fibers or fabrics have been mainly dyed with disperse dyestuffs. However, when a polyester fiber is dyed with a disperse dyestuff, the dyeing cost becomes exceedingly high; at the same time, the dyed product shows poor brightness. Further, when a polyester fiber fabric, mixed or spun with wool is dyed with a disperse dyestuff, the disperse dyestuff tends to stain the wool.

It is accordingly an object of this invention to dye a polyester fiber, mixed or spun with wool, in a bath of an inexpensive dyestuff such as acid dyestuff, and thus to dye a polyester fiber in a number of colors distinctly. At the same time, it is another object to drastically reduce the dyeing cost. Another object is to solve the problems of staining of wool of a mixed polyester fiber fabric with wool by a disperse dyestuff.

Various attempts have been made to provide processes for improving polyesters so that they may become dyeable with an acid dyestuff. As one of such processes, copolymerizing an amine compound with polyesters, as described in the specification of U.S. Pat. No. 2,739,958, has hitherto been known. However, according to this process, there are deficiencies in that the copolyesters are colored and upon carrying out copolymerization, the degrees of polymerization do not increase sufficiently, and polyester fibers obtained from this process fail to have the properties which are required for actual use.

Other known processes include a process of introducing an amine compound into the polyester and then spinning, as disclosed in British Pat. No. 1,040,854, and a process of treating a polyester fiber, prior to dyeing, with a solution or emulsion of a tertiary monoamine or an ammonium compound derived therefrom, as disclosed in British Pat. No. 1,060,623.

However, in the process of British Pat. No. 1,040,854, due to the high temperature that is attained when the amine compound is contained in the polyester, normally at the time of polymerization of the polyester or the melt spinning thereof, decomposition and coloration of the amine compound are brought about, and degradation and deterioration of the polyester per se are also obtained. Accordingly, not only is it found that a polymer having a sufficient degree of polymerization cannot be obtained, but also the resulting polymer, particularly when colored in yellow or brown, can hardly be offered for actual use.

In a process of British Pat. No. 1,060,623, which involves after treatment of a polyester with an amine compound carried out under relatively mild conditions, in order to obtain a polyester fiber sufficiently dyeable with an acid dyestuff, treatment for a considerable period of time is necessary, and the process becomes troublesome in stepwise operations; furthermore, the yellowing of the obtained polyester fiber due to sunlight or ultraviolet ray is so remarkable that the fiber is hardly marketable. In addition, after applying various heat treatments to the polyester fiber the amine compound decomposes to color the polyester fiber and sometimes the ester bond of the polyester fiber reacts with the amine compound to deteriorate the polyester.

Another object of the present invention is to minimize the degradation, deterioration, coloration and poor resistance to light of a polyester fiber, and to provide a polyester fiber which is so improved in quality so as to be effectively dyeable with an acid dyestuff.

Another object of the present invention is to provide a process for the preparation of such a polyester fiber which is dyeable with an acid dyestuff.

Further objects of the present invention will become apparent from the following description.

DETAILED DESCRIPTION OF THE INVENTION

The objects of the present invention are achieved by providing a polyester fiber containing about 0.5–10 percent by weight of at least one compound selected from the group consisting of a melamine compound (a) and an isomelamine compound (b) of the formulas (a)
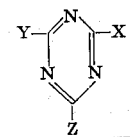

(wherein X, Y and Z stand for any of

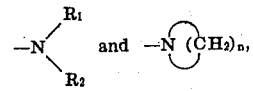

$R_1$ and $R_2$ stand for any of hydrogen atom, alkyl group preferably containing 1 to 20 carbon atoms, aralkyl group and cycloalkyl group, and n stands for an integer of from 2 to 10)

(b)
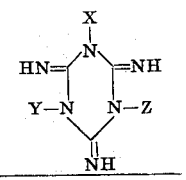

(wherein X, Y and Z stand for any of alkyl group preferably containing 1 to 20 carbon atoms, aralkyl group and cycloalkyl group)

Among the melamine compounds (a) of the present invention are, for example, melamine, NN'N''-trimethylmelamine, NN'N''-triethylmelamine, NN'N''-tri-n-butylmelamine, NN'N''-tri-hexylmelamine, NN'-diethylmelamine, NN'-tetraethylmelamine, NN'N''-tribenzylmelamine, NN'-dibenzylmelamine, N-monobenzyl-melamine, N-monoethyl-N'N''-dibenzylmelamine, N-n-butyl-N'N''-dibenzylmelamine, NN'-diethyl-N''-monobenzylmelamine, NN'N''-tri-cyclohexylmelamine, NN'-dicyclohexylmelamine, NN'N''-hexa-n-butylmelamine and trispentamethylenemelamine. An especially preferable melamine compound is NN'N''-tribenzylmelamine because of its good compatibility with polyester fiber and its excellent chemical stability.

Among the isomelamine compounds (b) of the present invention are, for example, NN'N''-triethylisomelamine, NN'N''-tri-n-butylisomelamine, NN'N''-trihexylisomelamine, NN'N''-tribenzylisomelamine, NN'N''-tricyclohexylisomelamine, NN'-di-n-butylisomelamine, NN'-dihexylisomelamine, NN'-dibenzylisomelamine and NN'-dicyclohexylisomelamine. An especially preferable isomelamine compound (b) is NN'N''-tribenzylisomelamine, because of its good compatibility with polyester fiber and its excellent chemical stability.

As a polyester constituting the polyester fiber of the present invention, polyethylene terephthalate or a copolymer thereof, poly-1, 4-cyclohexanedimethylene terephthalate or a copolymer thereof and polyester obtained from paraoxyethoxybenzoic acid or a copolymer thereof may be cited, however, it goes without saying that it is not limited thereto. An especially preferable polyester is a polyester whose ethylene terephthalate unit is present in a quantity of at least about 80 percent by weight.

Because the melamine compound (a) and the isomelamine compound (b) used in the present invention have affinity for polyester fiber, once they are introduced into it, these compounds do not tend to migrate outwardly from inside the fiber and this is conducive to very excellent color fastness.

The melamine compound (a) and the isomelamine compound (b) do not cause any appreciable degradation and deterioration of said polyester fiber and do not color the polyester fiber to any significant extent. Further, when the polyester fiber into which said compounds have been introduced is exposed to sunlight or ultraviolet ray for a long period of time, its presence does not lead to any significant yellowing.

Furthermore, because the melamine compound (a) and the isomelamine compound (b) have basic groups and bonds thereof, these compounds have excellent affinity for acid dyestuffs.

Accordingly, the polyester fiber containing the melamine compound (a) and the isomelamine compound (b) according to the present invention has excellent affinity for an acid dyestuff without sacrificing other various physical characteristics.

In the present invention, the content of the melamine compound (a) and the isomelamine compound (b) in the polyester fiber is about 0.5–10 percent by weight based on the weight of the polyester fiber. When the content is less than about 0.5 percent by weight, it is not possible to impart sufficient dyeability, using an acid dyestuff, to the polyester fiber. When the (a) and (b) content exceeds about 10 percent by weight, it is still possible to impart sufficient dyeability with an acid dyestuff, but it sometimes results in damaging other excellent characteristics of the polyester fiber, and is not preferable.

As a method of incorporating into a polyester fiber the melamine compound (a) and the isomelamine compound (b), appropriately proportioned, the following methods are preferably adopted.

i. A method of adding to the fiber-forming polyester the melamine compound (a) or the isomelamine compound (b) before spinning, then melt spinning the resulting and drawing the spun filaments to prepare the yarn. In carrying out this method, the melamine compound may be added to the fiber-forming polyester at the time of its polymerization, or it may be added to chips of the fiber-forming polyester or it may be mixed with the fiber-forming polyester in spinning apparatus.

ii. A method comprising drawing the polyester into yarn without any melamine compound (a) or isomelamine compound (b), and then treating the drawn polyester yarn with a solution containing the melamine additive, causing the additive to diffuse inside the polyester fiber.

The method of (ii) is the preferred method and produces a polyester fiber which has more affinity for an acid dyestuff than method (i).

As examples, this method may be practiced by heating and shrinking a polyester yarn drawn after the spinning step, thereafter passing said polyester yarn through a solution dissolving or dispersing the melamine compound (a) or the isomelamine compound (b) to cause the melamine compound (a) or the isomelamine compound (b) to diffuse inside said yarn, and redrawing said yarn. Or the method may be practiced by adhering to said polyester yarn after heating and shrinking, a solution containing dissolved or dispersed melamine compound (a) or isomelamine compound (b), thereafter passing said yarn through warm water or through a heated area to cause the melamine compound (a) or the isomelamine compound (b) to diffuse inside the yarn, and redrawing the yarn.

In this method, involving heating and shrinking the polyester yarn, it is generally known to pass the polyester yarn over a hot plate; however, it is more advantageous to immerse the yarn in a high boiling point organic solvent having a swelling effect on the polyester fiber and having no chemical reactivity with the polyester fiber. By passing the polyester yarn through such a hot solvent, it is possible to impart sufficient shrinkage to the polyester yarn uniformly and efficiently, within a short period of time. As such a hot solvent, a dipolar solvent, for example, dioxane, tetrahydrofuran, dimethyl sulfoxide, dimethyl formamide, dimethyl acetamide and N-methyl-2-pyrrolidone may be cited. The temperature of a heated medium on or through which the polyester yarn is passed to shrink the polyester fiber is determined by preliminary shrinkage tests. When a hot plate is used as a heating medium, the temperature on the hot plate is preferably above about 120° C. but below the softening point of the polyester fiber. When a solvent is used as a heating medium, a temperature above about 40° C. and below the boiling point of the solvent used, and below the softening point of the polyester fiber, is preferable. As a degree of shrinkage imparted to the polyester yarn at that time, about 10–50 percent is preferable. When a shrinkage more than about 50 is imparted to the polyester yarn, deterioration of the shrunken polyester yarn is observable and adhesion takes place, among the single yarns of the yarn bundle; this is not preferable. When a degree of shrinkage of less than about 10 percent is imparted to the polyester yarn, diffusion of the melamine compound (a) or the isomelamine compound (b) inside the yarn cannot be sufficiently achieved. From such situations, it has been learned that by heating and shrinking the polyester yarn to an extent of about 10–50 percent, it is possible to open up the internal structure to some extent, providing an amorphous zone of said polyester yarn to facilitate the subsequent diffusion of the melamine compound (a) or the isomelamine compound (b) inside the yarn and to thereby enable the melamine compound (a) or the isomelamine compound (b) inside the polyester yarn to reach the desired degree of saturation.

As the solvent dissolving the melamine compound (a) or the isomelamine compound (b) in this method, it is preferable to provide a solvent which does not substantially react with the polyester fiber or the melamine compound (a) or the isomelamine compound (b) and, if possible, one which has a swelling effect to some extent on the polyester fiber. And it is convenient from the viewpoint of the steps of the method to use a solvent that is the same as the heat solvent used for the shrinking treatment of the yarn. It is an appropriate dipolar solvent such as, for example, dioxane, tetrahydrofuran, dimethyl sulfoxide, dimethyl formamide, N-methyl-2-pyrrolidone and dimethyl acetamide, however, it goes without saying that it is not limited thereto.

It is normal that when water is used as a solvent, a dispersed solution of said melamine compound (a) or isomelamine compound (b) is prepared together with a dispersing agent such as an emulsifier and said dispersed solution is applied, a polyester yarn having the same advantages is obtained. In this method of treatment, the concentration of the melamine compound (a) or the isomelamine compound (b) in the solvent solution and the dispersed solution, the time of passing through the immersion of the polyester yarn in said solution, and the treatment temperature at that time are freely variable to reach the final objective degree of saturation of the melamine compound (a) or the isomelamine compound (b) inside the polyester yarn. The actual conditions may be determine as occasion demands, however, in consideration of the convenience of the operation of the method and the yarn quality and the productivity of the polyester yarn product, it is preferable to maintain the treatment temperature within the temperature range of below the boiling point of the solvent employed and below the softening point of the polyester fiber, and to maintain the time of passing through an immersion of the polyester yarn in the treatment bath about 0.1-60 seconds. Thereafter, the melamine compound (a) or the isomelamine compound (b) finally remaining on the surface of the polyester yarn is washed away and the yarn is redrawn at a proper draw ratio. Drawing is practiced because, since the polyester yarn has been shrunken by 10-50 percent, the yarn is stretchable and low in Young's modulus, and its characteristics as a yarn are poor. Accordingly, in order that the polyester yarn may satisfy the requirements of practicability as a yarn, it must be redrawn at a draw ratio of about 1.1-2.0. By redrawing, a polyester yarn having a yarn quality sufficient for practical use and sufficiently dyeable at atmospheric pressure with an acid dyestuff in deep color can be obtained.

SPECIFIC EXAMPLES

Next, the present invention will be described more specifically by reference to examples; however, it is understood that the scope of the claims is not intended to be limited by these examples.

EXAMPLE 1

A 15,000 total denier yarn bundle (a) (single filament denier 3) consisting of polyethylene terephthalate drawn 3.7 times was continuously passed through a vessel containing a dimethyl sulfoxide solution heated to 153° C. for 1.5-2 seconds. At this time, by regulating the rotary rollers before and after the vessel, the yarn bundle was substantially shrunken by 36 percent. The yarn bundle was treated continuously for 2 seconds under zero tension in a vessel of dimethyl sulfoxide solution at 100° C. containing in solution 5 percent by weight of NN'N''-tribenzylmelamine. Next, the yarn bundle was introduced into a water tank at 80° C. and washed for several minutes to remove NN'N''-tribenzylmelamine completely and dimethyl sulfoxide remained on the surfaces of the yarn bundle. Subsequently, the yarn bundle was redrawn at a draw ratio of 1.53 in a steam box. The characteristic values of the polyethylene terephthalate yarn bundle (B) thus obtained are described in table 1 in comparison with those of (A).

TABLE 1

|  | (A) | (B) |
|---|---|---|
| *Limiting viscosity | 0.643 (dl./g.) | 0.600 (dl./g.) |
| Strength (single yarn) | 15.6 (g.) | 13.0 (g.) |
| Elongation | 33.8 (%) | 45.1 (%) |
| **NN'N''-tribenzylmelamine content | 0.0 (wt %) | 4.5 (wt %) |

*Measurement of the limiting viscosity was carried out in orthochlorophenol at 25° C.

**After degumming the yarn sample with an aqueous solution at 55° C. containing 0.2 percent of sodium carbonate and 0.1 percent of nonylphenol ethyleneoxide condensate, it was measured from nitrogen analysis (using the Coleman Model 29 Nitrogen Analyzer) of the dried yarn sample.

In order to confirm the compatibility of NN'N''-tribenzylmelamine contained inside the obtained yarn sample, the sample after degumming was treated with boiling water for 90 minutes; thereafter NN'N''-tribenzylmelamine contained in the sample was measured by nitrogen analysis. The content of the additive in the treated sample was 4.4 percent by weight and it was confirmed that the additive hardly fell off. The obtained yarn sample was irradiated with a light from a fade-o-meter (FDA-D type manufactured by Atlas Electric Co.) for 20 hours to confirm presence of yellowing phenomenon. The results are shown in table 2.

TABLE 2

| Sample | *Yellowing degree Before irradiation | Yellow Index (b) After irradiation |
|---|---|---|
| (A) | +0.8 | +0.8 |
| (B) | −0.8 | +2.0 |

*Yellowing degree showed yellow index (b) of Hunter's Lab coordinate system. The measuring instrument was Color and Color difference meter TC-6D (manufactured by Tokyo Denshoku Co.)

From the foregoing results, it was confirmed that the polyester yarn containing NN'N''-tribenzylmelamine scarcely yellowed at all under the influence of light.

The yarn bundle (B) obtained was dyed with acid dyestuffs to check the dyeability and color fastness, the results are shown in table 3.

TABLE 3

| Sample: | Dyestuff used | Dyeing conditions | Degree of dye absorption after dyeing, percent |
|---|---|---|---|
| a | Xylene Fast Blue P (C.I. Acid Blue 82). | Concentration=5% by weight based upon fiber weight; liquor ratio=1:100; pH=3 (acetic acid); temperature=100° C.; time=1 hour. | 96 |
| b | Koyaku Rocceline (C.I. Acid Red 88). | do | 98 |

(Degree of dye absorption was determined by spectrophotometric analysis of residual dye solution).

As to the color fastness of the obtained yarn bundle (B), color fastness to sunlight, color fastness to washing, color fastness to potting, color fastness to dry cleaning and color fastness to ironing were measured in accordance with the standards of JIS-L-0841, 1045, 0875, 0860 and 0850 and all the values obtained were above 4.

EXAMPLE 2

One hundred g. of polymer chips (limiting viscosity measured at 25° C. in orthochlorophenol being 0.672) obtained from copolyester of polyethylene terephthalate copolymerizing 5 percent by weight of polyethylene glycol having a molecular weight of 5,000 and 5 g. of NN'N''-tribenzylmelamine were heated and stirred at 180° C. in nitrogen atmosphere for 1.5 hours, continuously, the obtained polymer chips were melt spun at 280° C. through 12 orifices, each 0.25 mm. diameter at a throughput of 10 g./minute and a takeup speed of 1,000 m./minute. The spun filaments thus obtained were subsequently drawn at a draw ratio of 3.6 on a hot pin 98° C. The characteristic values of the resulting yarn are shown in table 4.

TABLE 4

| Limiting viscosity of the spun filaments* | Tenacity (g./d.) | Elongation, percent | Initial tensile modulus, (g./d.) | NN'N''-tribenzylmelamine content** wt. percent |
|---|---|---|---|---|
| 0.606 (dl./g.) | 4.16 | 28.9 | 107 | 4.8 |

*Limiting viscosity was measured in orthochlorophenol at 25° C.
**After degumming the yarn with an aqueous solution at 55° C. containing 0.2% of sodium carbonate and 0.1% of nonylphenol ethylene oxide condensate, it was measured by nitrogen analysis (using the Coleman Model 29 Nitrogen Analyzer) of the dried yarn.

The yellowing due to exposure to light of the resulting yarn, and the compatibility of NN'N''-tribenzylmelamine contained inside the yarn were checked in the same manner as in example 1; however, yellowing and decrease of content of NN'N''-tribenzylmelamine in the fiber was not recognizable to any significant degree.

The yarn obtained was dyed with acid dyestuffs to check the dyeability and color fastness, and the results are shown in table 5.

TABLE 5

| Dyestuff used | Dyeing conditions | Degree of dye absorption after dyeing, (percent) |
|---|---|---|
| Sample: | | |
| c ..... Xylene Fast Blue P (C.I. Acid Blue 82). | Concentration=5% by weight based upon fiber weight; liquor ratio=1:100; temperature=125° C.; time=1.5 hours; pH=3 (acetic acid). | 60.3 |
| d ..... Koyaku Rocceline (C.I. Acid Red 88). | ....do.................... | 62.8 |

(Degree of dye absorption was determined by spectrophotometric analysis of residual dye solution).

As to the color fastness of the obtained yarn, color fastness to sunlight, color fastness to washing, color fastness to potting, color fastness to dry cleaning and color fastness to ironing were measured in accordance with the standards of JIS-L0841, 1045, 0875, 0860 and 0850 and all the values obtained were above 4.

EXAMPLE 3

A yarn bundle (A) the same as that in example 1 was continuously passed through a vessel containing a dimethyl sulfoxide solution heated to 153° C. for 1.5–2 seconds. At this time, by regulating the feed and withdrawal rolls before and after the vessel, the yarn bundle was substantially shrunken by 36 percent. The yarn bundle was treated continuously for 2 seconds under zero tension in a vessel of a dimethyl sulfoxide solution at 100° C. containing in solution 5 percent by weight of NN′N″-tribenzylmelamine. Next, the yarn bundle was introduced into a water tank at 80° C. and washed for several minutes to completely remove NN′NN″-tribenzylmelamine and dimethyl sulfoxide remaining on the surfaces of the yarn bundle. Subsequently, said yarn bundle was redrawn 1.53 times in a steam box. The characteristic values of the obtained yarn bundle of polyethylene terephthalate (C) are described in table 6 in comparison with those of (A).

TABLE 6

| | (A) | (C) |
|---|---|---|
| *Limiting viscosity | 0.634 (dl./g.) | 0.604 (dl./g.) |
| Strength (single yarn) | 15.6 (g.) | 13.2 (g.) |
| Elongation | 33.8 (%) | 48.2 (%) |
| **NN′N″-tribenzylmelamine content | 0.0 (wt %) | 4.1 (wt %) |

*Measurement of the limiting viscosity was carried out in orthochlorophenol at 25° C.

**After degumming the yarn sample with an aqueous solution at 55° C. containing 0.2 percent of sodium carbonate and 0.1 percent nonylphenol ethyleneoxide condensate, this was measured by nitrogen analysis (using the Coleman Model 29 Nitrogen Analyzer) of the dried yarn sample.

In order to confirm the compatibility of NN′N″-tribenzylmelamine contained inside the obtained yarn sample, the sample after degumming was treated with boiling water for 90 minutes; thereafter NN′N″-tribenzylmelamine contained in the sample was measured by nitrogen analysis. The content of the additive in the treated sample was 4.0 percent by weight and it was confirmed that the additive hardly decreased in content. The yarn sample thus obtained was irradiated with a light from a fade-o-meter (FDA-D type manufactured by Atlas Electric Co.) for 20 hours to confirm the presence of any yellowing phenomenon. The results are shown in table 7.

TABLE 7

| Sample | *Yellowing degree Before irradiation | Yellow Index (B) After irradiation |
|---|---|---|
| (A) | +0.8 | +0.8 |
| (C) | −1.5 | +1.2 |

*Yellowing degree showed yellow index (b) of Hunter's Lab coordinate system. The measuring instrument was Color and Color difference meter TC-6D (manufactured by Tokyo Denshoku Co.)

From the foregoing results, it was confirmed that the polyester yarn containing NN′N″-tribenzylmelamine was not yellowed by light to any substantial degree.

The yarn bundle (C) thus obtained was dyed with acid dyestuffs to check the dyeability and color fastness; the results are shown in table 8.

TABLE 8

| Dyestuff used | Dyeing conditions | Degree of dye absorption after dyeing, (percent) |
|---|---|---|
| Sample: | | |
| e ..... Xylene Fast Blue P (C.I. Acid Blue 82). | Concentration=5% by weight based upon fiber weight; liquor ratio=1:100; temperature=100° C.; time=1 hour; pH=3 (Acetic acid). | 86.8 |
| f ..... Koyaku Rocceline (C.I. Acid Red 88). | ....do.................... | 90.2 |

(Degree of dye absorption was determined by spectrophotometric analysis of residual dye solution.)

As to the color fastness of the obtained yarn bundle (C), color fastness to sunlight, color fastness to washing, color fastness to potting, color fastness to dry cleaning and color fastness to ironing were measured in accordance with the standards of JIS-L-0841, 1045, 0875, 0860 and 0850 and all the values obtained were above 4.

EXAMPLE 4

The yarn characteristic values, the compatibilities of additives, yellowing degrees and dyeabilities of samples containing various additives are grouped in tables 9 and 10.

Compositions of the polymers used
  A. Polyethylene terephthalate (limiting viscosity 0.634)
  B. Copolymer of polyethylene terephthalate copolymerizing 5 percent by weight of polyethylene oxide having a molecular weight of 5,000 (limiting viscosity 0.672)
  C. Copolymer of polyethylene terephthalate copolymerizing 5 mol percent of isophthalic acid (limiting viscosity 0.665)
  D. Poly-p-ethyleneoxybenzoate (limiting viscosity 0.626)
Adding method
  A. The aftertreating method
  B. The mix melt method
Dyeing method
  A. Xylene Fast Blue P 5 percent by weight (C.I. Acid Blue 82), Temperature 100° C. Time 1 hour, Liquor ratio 1:100, pH 3 (Acetic acid)
  B. Xylene Fast Blue P 5 percent by weight (C.I. Acid Blue 82), Temperature 125° C. Time 1.5 hours, Liquor ratio 1:100, pH 3 (Acetic acid)

As to the color fastness of the samples of tables 9 and 10, color fastness to sunlight, color fastness to washing, color fastness to potting, color fastness to dry cleaning and color fastness to ironing were measured in accordance with the standards of JIS–L–0841, 1045, 0875, 0860 and 0850 and all the values obtained were above 4.

TABLE 9

| Additive (melamine compound) | Composition of the polymer used | Adding method | Dyeing method | Physical property values of the sample | | | | | | Yellow index (b) of the sample*** | | Degree of dye absorption*** (percent) |
|---|---|---|---|---|---|---|---|---|---|---|---|---|
| | | | | Limiting viscosity* (dl./g.) | Tenacity (g./d.) | Elongation (percent) | Initial tensile modulus (g./d.) | Content of the additive** (percent) | Content of the additive after treatment with boiling water | Before irradiation | After irradiation | |
| NN'N''-triethylmelamine $H_5C_2HN-\underset{N}{\overset{N}{\bigcirc}}-NHC_2H_5$ $NHC_2H_5$ | A B | A B | A B | 0.593 0.601 | 3.5 4.0 | 42.5 30.1 | 60.2 100.2 | 3.6 4.0 | 3.6 3.9 | −0.9 −0.2 | +1.0 +2.0 | 92.3 61.6 |
| NN'-tetraethylmelamine $H_5C_2\underset{H_5C_2}{\overset{C_2H_5}{N}}-\underset{N}{\overset{N}{\bigcirc}}-N\underset{C_2H_5}{\overset{C_2H_5}{<}}$ $NH_2$ | A B | A B | A B | 0.590 0.596 | 3.6 4.1 | 44.2 29.6 | 61.6 103.5 | 3.8 4.3 | 3.8 4.2 | −1.2 −0.8 | +0.8 +1.2 | 90.2 60.3 |
| N-monobenzylmelamine $H_2N-\underset{N}{\overset{N}{\bigcirc}}-NHCH_2C_6H_5$ $NH_2$ | A C | A B | A B | 0.601 0.600 | 3.8 4.0 | 46.1 28.7 | 58.5 92.8 | 4.1 4.8 | 4.1 4.6 | −1.1 −1.1 | +1.0 +0.8 | 8.28 51.9 |
| NN'-dibenzyl-N-monoethylmelamine $H_5C_6H_2CHN-\underset{N}{\overset{N}{\bigcirc}}-NHCH_2C_6H_5$ $NHC_6H_5$ | D B | A B | A B | 0.583 0.605 | 3.6 4.2 | 43.0 31.2 | 56.2 96.6 | 4.5 2.8 | 4.3 2.8 | −0.9 −0.2 | +1.3 +1.8 | 89.6 49.0 |
| Trispentamethylenemelamine | C | B | B | 0.610 | 4.3 | 30.5 | 98.0 | 6.0 | 5.8 | −0.6 | +1.9 | 64.7 |

TABLE 10

| Additive (Isomelamine compound) | Composition of the polymer used | Adding method | Dyeing method | Physical property values of the sample ||||||| Yellow index (b) of the sample*** || Degree of dye absorption**** (percent) |
|---|---|---|---|---|---|---|---|---|---|---|---|---|
| | | | | Limiting viscosity* (dl./g.) | Tenacity (g./d.) | Elongation (percent) | Initial tensile modulus (g./d.) | Content of the additive** (percent) | Content of the additive after treatment with boiling water | | Before irradiation | After irradiation |
| N,N',N''-tri-n-butyl isomelamine | A | A | A | 0.604 | 3.6 | 46.2 | 50.4 | 3.8 | 3.8 | | −1.1 | +0.8 | 89.5 |
| N,N',N''-tricyclohexyl isomelamine | D | A | A | 0.597 | 3.4 | 42.6 | 49.1 | 4.2 | 4.1 | | −0.9 | +1.2 | 95.2 |

*Limiting viscosity was measured at 25° C. in orthochlorophenyl.
**Content of the additive was measured from nitrogen analysis.
***Yellow index (b) is a value after irradiation of a light from a fade-o-meter (FDA-D type manufactured by Atlas Electric Co.)
****Degree of dye absorption was measured by spectrophotometric analysis o residual dye solution.

EXAMPLE 5

One hundred g of polymer chips (limiting viscosity measured at 25° C. in orthochlorophenol being 0.672) obtained from copolyester of polyethylene terephthalate copolymerizing 5 percent by weight of polyethylene glycol having a molecular weight of 5,000, 4.5 g. of NN′N″-tribenzylmelamine and 1.5 g. of NN′N″-tribenzylisomelamine were heated and stirred at 165° C. in nitrogen atmosphere for 1.5 hours, continuously the obtained polymer chips were melt spun at 273° C. through 12 orifices, each 0.25 mm. diameter at a throughput of 10 g./minutes and a takeup speed of 1,000 m./minutes. Subsequently, the obtained spun filaments were drawn 3.55 times on a hot pin at 98° C. The characteristic values of the obtained yarn are shown in table 11.

TABLE 11

| *Limiting viscosity of the yarn | Tenacity | Elongation | Initial tensile modulus | **Content of the additives |
| --- | --- | --- | --- | --- |
| 0.585 (dl./g.) | 3.91 (g./d.) | 28.2 (%) | 102.5 (g./d.) | 5.8 (wt %) |

*Limiting viscosity was measured at 25° C. in orthochlorophenol.

**Measured from nitrogen analysis (using the Coleman Model 29 Nitrogen Analyzer) of the dried yarn after degumming.

The sample was dyed under conditions same as those of $c$ in example 2. The degree of dye absorption after dyeing was 68 percent and said sample was dyed a deep blue.

The following is claimed:

1. A polyester having improved dyeability consisting essentially of a fiber-forming polyester containing about 0.5–10 percent by weight of at least one compound selected from the group consisting of a melamine compound (a) and an isomelamine compound (b) of the formulas (a)
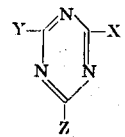

(wherein X, Y and Z each represent a member selected from the group consisting of

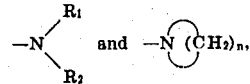

wherein $R_1$ and $R_2$ each represent a member selected from the group consisting of hydrogen atom, alkyl group, aralkyl group and cycloalkyl group and $n$ is an integer of from 2 to 10)

(b)
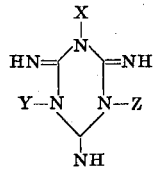

(wherein X, Y and Z each represent a member selected from the group consisting of alkyl group, aralkyl group and cycloalkyl group).

2. The polyester fiber defined in claim 1 wherein said melamine compound is NN′N″-tribenzylmelamine.

3. The polyester fiber defined in claim 1 wherein said isomelamine compound is NN′N″-tribenzylisomelamine.

4. The polyester fiber defined in claim 1, wherein each said alkyl group contains from 1 to 20 carbon atoms.

5. The polyester fiber according to claim 1, wherein said fiber-forming polyester is comprised of not less than 80% by weight of ethylene terephthate units.

* * * * *